Oct. 31, 1933.   F. B. HUNT   1,933,060
METHOD OF MANIPULATING PRESSURE CONTAINING DRUMS
Filed Jan. 12, 1932
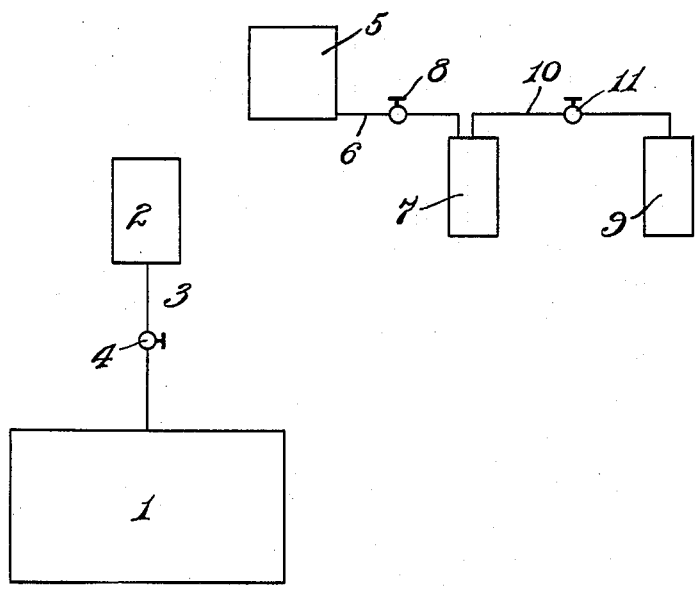
INVENTOR.
*Franklin B. Hunt,*
BY
*Hood & Hahn.*
ATTORNEYS Patented Oct. 31, 1933

1,933,060

UNITED STATES PATENT OFFICE 1,933,060

METHOD OF MANIPULATING PRESSURE-CONTAINING DRUMS

Franklin B. Hunt, Chicago, Ill., assignor to The Liquid Carbonic Corporation, Chicago, Ill., a corporation of Delaware Application January 12, 1932. Serial No. 586,216

11 Claims. (Cl. 62—91.5)

The present application relates to a method of using pressure material having certain characteristics, and more particularly to a method of manipulating the drums containing such material in such a manner as to reduce to a minimum the waste of such material under certain conditions. While the method is primarily applicable in connection with the use of material which is gaseous at atmospheric pressures and temperatures and which is capable of reduction to the liquid or solid phases upon proper manipulation of pressure and temperature conditions impressed thereon, I do not intend to be limited to this particular phase of my invention, since the invention broadly may be applied to other substances, as will be set out hereinafter.

The invention has been illustrated and will be primarily described in connection with the use of carbon dioxide under such circumstances that the carbon dioxide must be supplied to a point of use at a pressure value above a predetermined minimum substantially above atmospheric pressure. It will be understood, however, that my invention is not limited by these details. It is the primary object of the invention to conserve a large proportion of that mass of carbon dioxide which will remain in the container after the pressure of carbon dioxide in the container has fallen substantially to the predetermined minimum pressure value above mentioned, so that the carbon dioxide remaining in the container can not be used further directly at the point of use. Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, or in the specific steps stated, so long as the scope of the appended claims is not violated.

The single figure is a diagrammatic representation of apparatus for use in carrying out the process of my invention.

It is well known that carbon dioxide can exist in the solid phase at a temperature of approximately —110° F. and at atmospheric pressure. Under these conditions, the solid carbon dioxide will sublimate. If a mass of solid carbon dioxide is sealed in a suitable pressure container, and if heat is applied (as, for instance, atmospheric heat) the solid carbon dioxide will sublimate within the container until the gas pressure within the container reaches a value of approximately 60 pounds per square inch (gage). As heat is continually applied from the atmosphere, or otherwise, liquefaction will set in until, eventually, the carbon dioxide in the container will attain substantially the temperature of atmosphere, at which time the saturated vapor within the container will be in equilibrium with the liquid and/or solid carbon dioxide therein.

There are numerous instances in industry wherein the practice of a process requires that carbon dioxide be supplied to a point of use at a pressure materially above atmospheric pressure as, for instance, 150 pounds per square inch gage pressure. In the drawings, the block indicated at 1 represents mechanism for carrying out a process of this sort, carbon dioxide being supplied thereto from a vessel or chamber 2 connected to supply carbon dioxide in the gaseous phase through the pipe 3 which is preferably controlled by a pressure-regulating valve 4. As gas is removed from the container 2, some of the liquid carbon dioxide in the container vaporizes to form more gas, and this vaporization continues until all of the liquid in the chamber has been vaporized and only gaseous carbon dioxide remains. So long as any of the carbon dioxide in the chamber is in the liquid phase, the pressure within the chamber is the pressure of saturated carbon dioxide vapor for the temperature of the liquid in the chamber. However, when vaporization is complete, the pressure in the container becomes a function of the temperature of the gaseous carbon dioxide, the volume of the container, and the mass of carbon dioxide in the container. Obviously, if the temperature is held constant, the pressure within the container will drop as gas is withdrawn therefrom. When the dropping pressure reaches the value for which the valve 4 is set, the chamber 2 is, of course, exhausted so far as its possibility for use in connection with the process apparatus 1 is concerned. Of course, a small further amount of carbon dioxide might be drawn from the container 2 by heating the same, but the possibility of heating the container is limited by the fact that excessive heat is likely to damage the container, and, through the use of any reasonable amount of heating, only a relatively small mass of carbon dioxide can be made available. Even if such heat is applied, a considerable mass of carbon dioxide will remain in the container 2, entirely unavailable for use in connection with the apparatus 1.

Of course, the mass of carbon dioxide remaining in the container 2 will be a function of the volume of the container; and the wastage, under ordinary practice, may be reduced if smaller containers are used. There is, however, a limit below which it is not economically practical to go, since there are rigidly enforced standards determining the mass of carbon dioxide which may be charged into a container of given volume. It is a primary object of the present invention to provide a method whereby substantially all of the carbon dioxide mass remaining in the chamber 2 may be reclaimed.

Referring, again, to the drawing, the numeral 5 designates a station at which solid carbon dioxide is either made or stored. A line, indicated at 6, which may be in the form of a chute, is controlled by a suitable valve 8. At the beginning of the present process, the chamber 7 is empty, and the chamber 9 is exhausted, so far as use with the apparatus 1 is concerned, carbon dioxide having been drawn off from said chamber 9 until the pressure therein is below the minimum required by the apparatus 1. The line 6 is connected to supply solid carbon dioxide from the station 5 to the chamber 7. A line 10, controlled by a valve 11, connects the chambers 7 and 9.

The chamber 7, open to the atmosphere, is charged with carbon dioxide in the solid phase from the station 5, slightly less than the permissible mass of carbon dioxide being charged into the chamber 7 in the solid phase. The chamber 7 is now sealed, and the valve 11 is opened. At the moment of sealing, the pressure in the chamber 7 is atmospheric pressure, while the pressure in the chamber 9 is the predetermined minimum for the apparatus 1; for instance, 150 pounds gage pressure. The pressure differential between the chambers 9 and 7 causes a flow of gas through the line 10 from the chamber 9 to the chamber 7. As the gas from the chamber 9 (which is substantially at atmospheric temperature) enters the chamber 7 (the internal temperature of which is substantially the temperature of solid carbon dioxide at atmospheric pressure; viz., minus 110° F.) it is rapidly cooled, whereby its volume is materially reduced. Initially, the gas entering the chamber 7 from the chamber 9 may actually be solidified because of its tendency to expand as it enters the low-pressure area within the chamber 7, and because of the cooling effect of the solid carbon dioxide which has been charged into the chamber 7. Of course, the entry of the gas into the chamber 7 from the chamber 9 tends to raise the temperature within the chamber 7, and tends also to raise the pressure within the chamber 7; and the sublimation of the solid carbon dioxide which has been charged into the chamber 7 likewise tends to raise the pressure in said chamber, while the atmospheric heat impressed upon the chamber 7 likewise tends to raise the temperature thereof; so that, in practice, it has been found that even this method will not completely exhaust the chamber 9 to atmospheric pressure. A very large proportion of the gas remaining in the chamber 9, after its use with the apparatus 1 has become impossible, is, however, exhausted from the chamber 9 and reclaimed in the chamber 7.

Suitable gages (not shown) may be provided in the line 10 to indicate the direction of flow of gas therein, so that an attendant may close the valve 11 immediately upon equalization of the pressures in the chambers 9 and 7; or the valve 11 may be of the check valve type so that it will automatically close when the pressures in the chambers 7 and 9 are equalized.

Thus it will be seen that, when the pressure in the chamber 2 has been so far reduced that it is no longer useful in connection with the apparatus 1, the chamber 2 may be disconnected from the line 3, and the charged chamber 7 may be connected in its place. The chamber 9 is then disconnected from the line 10 and blown down to atmospheric pressure. The chamber 9 is then connected to the lines 6 and 10 in place of the chamber 7, and the chamber 2 is connected to the line 10 in place of the chamber 9, whereupon the above-described cycle is repeated to prepare the chamber 9 for use in connection with the apparatus 1.

Obviously, each of the chambers 2, 7, and 9 may be considered as representing a series of containers.

While my present invention finds perhaps its most useful application in connection with carbon dioxide and similar substances, wherein gas pressure is primarily depended upon, it will be obvious that the principle thereof may be applied to liquid-containing chambers in which there is no phase change of the type above described, and in which the controlling pressure is a static pressure.

I claim as my invention:

1. The method of using material which comprises the steps of supplying such material from a charged chamber to a point of use where a predetermined minimum super-atmospheric pressure is required, until the mass of material in said chamber is reduced to a point at which material can no longer be supplied at such pressure, charging a second chamber with a mass of such material substantially at atmospheric pressure, and thereafter connecting said first chamber to said second chamber, whereby a portion of the material remaining in said first chamber will flow to said second chamber.

2. The method of using material which comprises the steps of supplying such material in the gaseous phase from a charged chamber until the pressure of material in said chamber falls to a predetermined minimum, charging a second chamber with such material at a pressure below said predetermined minimum, and connecting said first chamber to said second chamber, whereby the pressure differential between said chambers causes a portion of the material in said first chamber to flow to said second chamber.

3. The method of using material which comprises the steps of supplying such material in the gaseous phase from a charged chamber until the pressure of material in said chamber falls to a predetermined minimum, charging a second chamber with such material in the solid phase at a pressure below said predetermined minimum, and connecting said first chamber to said second chamber, whereby the pressure differential between said chambers causes a portion of the material in said first chamber to flow to said second chamber.

4. The method of using material which comprises the steps of supplying such material in the gaseous phase from a charged chamber until the pressure of material in said chamber falls to a predetermined minimum, charging a second chamber with such material at a pressure below said predetermined minimum, the mass of material charged into said second chamber exceeding the mass of material remaining in said first chamber, and connecting said first chamber to said second chamber, whereby the pressure differential between said chambers causes a portion of the material in said first chamber to flow to said second chamber.

5. The method of using material which comprises the steps of supplying such material in the gaseous phase from a charged chamber until the pressure of material in said chamber falls to a predetermined minimum, charging a second chamber with such material in the solid phase at a pressure below said predetermined minimum, the mass of material charged into said second chamber exceeding the mass of material remaining in said first chamber, and connecting said first chamber to said second chamber, whereby the pressure differential between said chambers causes a portion of the material in said first chamber to flow to said second chamber.

6. The method of using material which comprises the steps of supplying such material in the gaseous phase from a charged chamber until the pressure of material in said chamber falls to a predetermined minimum, charging a second chamber with a mass of such material exceeding the mass of material remaining in said first chamber, the material charged into the second chamber being in a non-gaseous phase and having pressure and temperature values below the corresponding values of the material in said first chamber, and connecting said first chamber to said second chamber, whereby the pressure differential between said chambers causes a portion of the material in said first chamber to flow to said second chamber.

7. The method of using material which comprises the steps of supplying such material in the gaseous phase from a charged chamber until the pressure of material in said chamber falls below a predetermined minimum, charging into a second chamber a mass of such material in a non-gaseous phase, and connecting said first chamber to said second chamber, the temperature and pressure of the material in said second chamber being lower than the temperature and pressure of the material in said first chamber, whereby the pressure differential between said chambers causes material to flow from said first chamber to said second chamber, and whereby, as such flowing material enters said second chamber, the volume thereof is reduced.

8. The method of using material which comprises the steps of supplying such material in the gaseous phase under inherent pressure from a charged chamber until the pressure of material in said chamber falls below a predetermined minimum, charging into a second chamber a mass of such material in an unstable non-gaseous phase, and connecting said first chamber to said second chamber, the temperature and pressure of the material in said second chamber being lower than the temperature and pressure of the material in said first chamber, whereby the pressure differential between said chambers causes material to flow from said first chamber to said second chamber, and whereby, as such flowing material enters said second chamber, the volume thereof is reduced.

9. The method of using carbon dioxide which comprises the steps of supplying carbon dioxide in the gaseous phase from a charged chamber to a point of use until the pressure of carbon dioxide in said chamber falls below a predetermined minimum, charging into a second chamber a mass of carbon dioxide in the solid phase, and providing communication between said first and second chambers, whereby the pressure differential between the interiors of said chambers will cause gaseous carbon dioxide to flow from said first chamber into said second chamber.

10. The method of using carbon dioxide which comprises the steps of supplying carbon dioxide in the gaseous phase from a charged chamber to a point of use until the pressure of carbon dioxide in said chamber falls below a predetermined minimum, charging into a second open chamber a mass of carbon dioxide in the solid phase at substantially atmospheric pressure, sealing said second chamber and substantially simultaneously providing communication between said first and second chambers, whereby the pressure differential between the interiors of said chambers will cause gaseous carbon dioxide to flow from said first chamber into said second chamber.

11. The method of using carbon dioxide which comprises the steps of supplying carbon dioxide in the gaseous phase from a charged chamber to a point of use until the pressure of carbon dioxide in said chamber falls below a predetermined minimum, charging into a second chamber a mass of carbon dioxide in the solid phase, and providing communication between said first and second chambers, whereby the pressure differential between the interiors of said chambers will cause gaseous carbon dioxide to flow from said first chamber into said second chamber, and whereby the temperature differential between said chambers results in a phase change of the entering carbon dioxide upon entry into said second chamber.

FRANKLIN B. HUNT.